April 11, 1939. E. M. BRIGHT Re. 21,045

PROCESS OF AND APPARATUS FOR APPLYING NITROCELLULOSE COATING

Original Filed July 23, 1936

INVENTOR.
ELVIN M. BRIGHT
BY Henry G. Dybwig
HIS ATTORNEY.

Reissued Apr. 11, 1939 Re. 21,045

UNITED STATES PATENT OFFICE 21,045

PROCESS OF AND APPARATUS FOR APPLYING NITROCELLULOSE COATING

Elvin M. Bright, Dayton, Ohio, assignor to John M. Wallace, Cincinnati, Ohio, trustee Original No. 2,130,225, dated September 13, 1938, Serial No. 92,156, July 23, 1936. Application for reissue January 20, 1939, Serial No. 251,976

19 Claims. (Cl. 91—68)

This invention relates to a process of applying a nitrocellulose coating to an article and more particularly to a process of applying a nitrocellulose coating to an article by dipping.

An object of this invention is to apply a nitrocellulose coating to a body by dipping the body in a solution of cellulose material and subsequently controlling the curing of the coating.

Another object of this invention is to treat the nitrocellulose coating applied to the body in the presence of the fumes formed from the solvent used in dissolving the nitrocellulose material.

Another object of this invention is to control the osmotic pressure gradient of the solvent within the nitrocellulose coating during the curing thereof.

Another object of this invention is to use a solution for treating the article that has been coated, which solution has an attraction for the solvent used in dissolving the nitrocellulose material.

Another object of this invention is to rapidly withdraw the solvent from the nitrocellulose coating near the outer surface for a short period of time, followed by a confinement of the remaining solvent within the nitrocellulose coating for a longer period of time.

Another object of this invention is to periodically withdraw the solvent from near the outer surface of the coating, followed by alternate periodic confinement of the solvent so as to cause a uniform distribution of the solvent within the coating during the period that the solvent is confined.

Another object of this invention is to apply a spray of a solution to the article, which solution has an affinity for the solvent used.

Other objects and advantages reside in the construction of parts, the combination thereof and the mode of operation, as will become more apparent from the following description.

Figure 1:
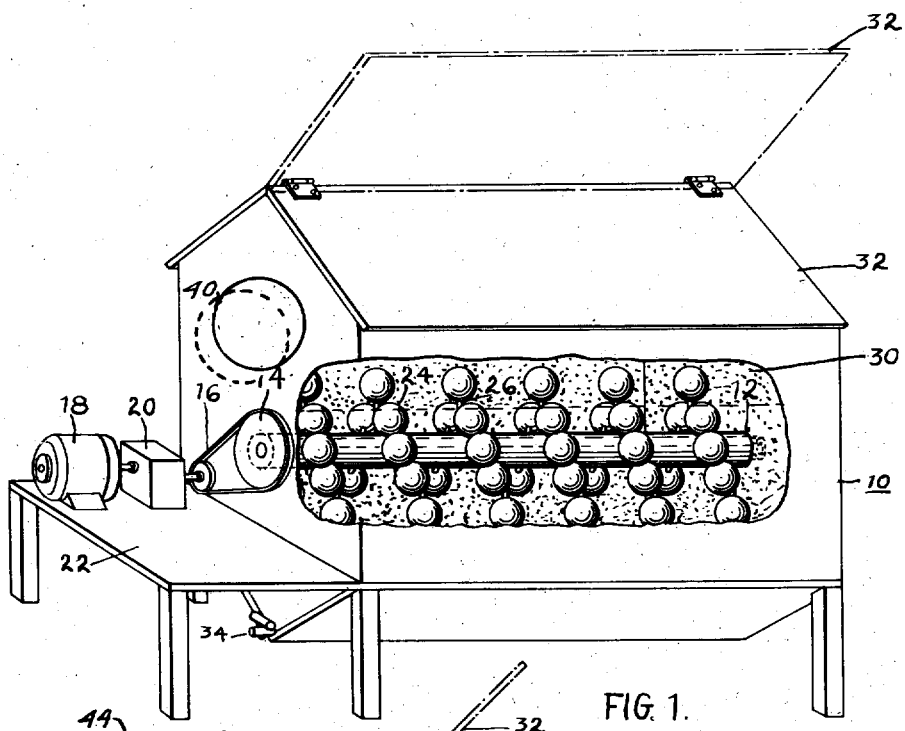
Fig. 1 is a perspective view of a device for curing the nitrocellulose coating, with parts broken away.

Gases or fumes from a solution consisting of sixty percent acetone, twenty-five percent isopropyl acetate and fifteen percent anhydrous isopropanol, sold under the trade name Isotone, have a great affinity for fumes of certain solutions, such as petroleum distillate, benzine, etc. Fumes of petroleum distillates may be obtained by spraying operations.

In the past, numerous attempts have been made to coat bodies with nitrocellulose material. Some have attempted to use solvents which will permit the body to be coated without blisters, pin holes and wrinkling taking place; but the results have been unsatisfactory. The only process that has been used in the past that seems to be satisfactory is the reduction of the temperature of the coating immediately upon being applied so as to congeal the coating and thereby reduce the temperature of the solvent. This, however, proves extremely expensive, as elaborate refrigerating devices are required.

It has been found that by controlling the evaporation or the boiling of the solvent it is possible to remove the solvent very rapidly without the formation of pin holes, without bubbles forming within the coating, thereby eliminating blisters and without condensation forming upon the coating as it is being cured, which condensation has a deleterious effect upon the outer surface.

This has been accomplished by subjecting the coated article to a solution having a great attraction for the solvent, which solution rapidly withdraws the solvent from the coating. However, if the article is submerged in the solution for a long period of time the attraction of the solution for the solvent is sufficiently great to create a vacuum in the coating resulting in rapid evaporation, or possibly boiling of the solvent, causing the escaping fumes to form into bubbles, which bubbles probably grow as they move outwardly, resulting in the bubbles leaving voids in the path of travel, which voids form what is generally called pin holes in the surface of the coating.

Before going into details as to the process used, a brief discussion will be made of some of the attributes of solvents and of solutes. Whenever the solvent is not evenly distributed throughout the solute, pressures are created within the substances which are generally designated as osmotic pressures. Whenever the osmotic pressure throughout the substances is not uniform, the rate of increase with distance of the osmotic pressure within the solvent may be referred to as osmotic pressure gradient.

If the solvent is volatile it may leave the solute as a vapor. Consequently, when the volatile solvent is used it will begin to vaporize, the rate of vaporization being influenced among other things by the vapor pressure of the surrounding medium. If the surrounding medium consists of or includes saturated vapor like that given off by the solvent, it is reasonable to assume vaporization of the solvent will cease whenever the surrounding vapor is thus saturated.

Instead of the solvent passing into a gaseous medium surrounding the article, the solvent may flow possibly as a liquid into a solution having an attraction for the solvent, in which solution the solute of the coating material is insoluble. When the solvent is leaving the solute in passing into the solution, it probably leaves due to difference in osmotic pressure found within the coating and the solution. If the solvent and its solute is kept in this solution that has a great attraction for the solvent, the osmotic pressure may possibly be reduced to a point where vaporization takes place within the solute. As the solvent is withdrawn, it creates a partial vacuum unless the coating is permitted to set sufficiently to cause a shrinkage thereof, thereby eliminating the vacuum. When a vacuum forms in at least portions, this difference in osmotic pressure and the attraction for the solvent may cause the solvent to boil or form bubbles of vapor, escaping bodily so as to leave voids which resemble pin holes surrounded by a small dimple whenever the bubble bursts at the surface of the solute.

As the process used in coating articles by a nitrocellulose substance was first used in coating balls about four and one-half inches in diameter, the process will be described as used in coating such balls, with the understanding that the process may be modified so as to accommodate various shapes, varieties and sizes.

The balls were first dipped into a nitrocellulose solution consisting of pyroxylin dissolved in acetone or Isotone. The balls after being dipped in the nitrocellulose solution were rotated or moved into a solution having a great attraction for the solvent used in the nitrocellulose material. Gasoline and various other petroleum products have been found to be very satisfactory. Methanol may also be used. The balls were removed within a short period of time from the gasoline and suspended in a medium saturated, or nearly saturated, with fumes from the solvent. The balls were then momentarily exposed to air having very little fumes.

This was followed by the balls being advanced into a medium containing a great amount of fumes and then returned to the solution having a great attraction for the solvent and the cycle repeated. These series of steps were carried on cyclically for an hour to an hour and fifteen minutes, the total time for each cycle constituting approximately two minutes.

From this it may be readily seen that some thirty to forty cycles were sufficient to cure the nitrocellulose coating to such an extent that the balls might then be removed to the open air and permitted to dry without pin holes forming in the surface thereof, without blistering and without wrinkling. The resulting surface was found to be extremely smooth. By regulating the viscosity of the nitrocellulose solution, the thickness of the coating may be controlled from a few thousandths of an inch in thickness to several hundredths of an inch in thickness.

Although the theory of the process has not been thoroughly analyzed, the following explanation is offered as a plausible theory, with the understanding that the scope and validity of the patent is not to be influenced by the accuracy of the following explanation.

The nitrocellulose material applied to the surface of the article to be coated upon being placed in the solution that has an attraction for the solvent used in dissolving the nitrocellulose material, gives up some of the solvent. It is possible that the solvent flows from the nitrocellulose coating where it is insoluble in the solution having an attraction for the solvent under the influence of osmotic pressure. That is, the solvent drains from the nitrocellulose coating into the solution.

If, however, this operation is continued for a long period of time, the osmotic pressure gradient becomes sufficiently steep or great from the outside to the inside of the coating so as to cause the solvent to evaporate very rapidly and possibly boil. This rapid evaporation or boiling, whichever it may be, if it is not checked, will cause bubbles to form within the nitrocellulose coating, which bubbles are attracted to the outer coating of the nitrocellulose where they burst, leaving voids surrounded by a dimple, generally referred to as pin holes.

Therefore, it is necessary to check the rapid giving off of the solvent, as it is very desirable to have the surface of the finished product smooth and uniform, without any deformities or irregularities in the surface. In the past, attempts have been made to douse the coated article into cold gasoline and then remove it into the open atmosphere; but the vapor pressure in the open atmosphere is sufficiently low to permit the solvent to escape into the air in the form of fumes, that is, removing the article from the solution having an attraction for the solvent into the air does not check evaporation of the solvent.

In the present process the balls after being submerged in the solution having an attraction for the solvent, are removed into a zone where the gaseous medium surrounding the article is saturated with fumes from the solvent. The result of this is an immediate check of the evaporation of the fumes. While the evaporation is thus checked, the osmotic pressure throughout the coating is equalized, so that the osmotic pressure gradient flattens into a straight and flat line.

After the osmotic pressure within the coating has been equalized or substantially so, the balls may be removed into the open air where the vapor pressure is considerably lower, at which time evaporation may take place; but at the same time oxidation or a setting of the nitrocellulose coating takes place. From this position the balls may be advanced into fumes again to check the evaporation, again permitting the osmotic pressure to be equalized throughout the coating. From the fumes the balls may be advanced back into the solution having an attraction for the solvent, beginning with the second cycle, which cycle is the same as the former. When the article has passed through a sufficient number of cycles, the article may be removed into the open air as the solvent remaining in the article is not sufficient to cause a deleterious effect upon the coating by evaporating. Likewise, condensation forming upon the surface of the ball will not injure the coating, as the coating has set sufficiently so as to be immune from deleterious effects caused by condensation. Within a few hours after being dipped the balls are ready for the buffing operation if this is required, to remove deposits formed while dousing the balls in the solution.

In order to carry out the process of coating articles with nitrocellulose material it is desirable to have suitable apparatus. For the purpose of illustration, the following apparatus will be described, although it is fully understood that various types of devices may be used for carrying out the process.

Referring to the drawing a cabinet 10 that is enclosed and preferably air-tight is provided with a rotary support 12 for the article, which support may carry the article in any suitable manner. The support 12 may be journalled in the ends of the cabinet 10 and provided with a shaft projecting through one end carrying a suitable pulley 14 driven by a belt 16 actuated by a motor 18 through a suitable speed reducing mechanism 20. The motor 18 and the speed reducing mechanism 20 may be supported upon a suitable platform 22.

The rate of rotation of the support 12 is dependent upon the speed of the motor 18 and the effectiveness of the speed reducing mechanism found between the motor 18 and the support 12. For some types of work one-half revolution per minute produces excellent results. As the support 12 rotates, the article designated by the reference character 24 carried upon a suitable arm 26 fixedly attached to the support 12 rotates through a circular path. When the article 24 is below the liquid level 28 it is submerged in a solution that has an attraction for the solvent used in dissolving the nitrocellulose material used in coating the article 24.

The cabinet 10 being air-tight, or practically so, will retain all fumes given off by the solvent of the coating. If acetone or Isotone is used, such acetone or Isotone as the case may be, evaporates very rapidly both from the surface of the article 24 and from the surface of the solution 28. In so doing the fumes from the solvent are collected above the solution 28. The height thereof depends entirely upon the length of time the device has been in operation and the amount of air that may be added from time to time in exchange for fumes, as will appear more fully later. As the fumes given off by the solvent are heavier than air, the fumes will be confined to a fairly well defined zone. Due to the slow rotation of the support 12, the fumes and the air are not intermixed to a great extent by the agitation caused by the rotation of the support 12 and the articles carried thereby.

It is desirable that a portion of the path of rotation of the article 24 extends through a zone of air. In so doing it seems that the nitrocellulose material sets or cures—probably by oxidation. Therefore, it is desirable to maintain the zone of the fumes below the upper level of the path of the articles to be coated. Consequently the cabinet 10 contains three zones, the one below the liquid level 28, the second a zone of fumes above the liquid level 28, but below the air level 30. Above the fume zone is found air. It is not necessary that the two upper zones be well defined, providing there are sufficient fumes to create a saturated condition for a portion of the path, sufficient to stop evaporation of the solvent immediately upon the article leaving the solution, thereby permitting the osmotic pressure to seek its own level throughout the coating of the article. As the article is advanced upwardly there may be a layer containing both air and fumes, the fumes tending to prevent evaporation, the oxygen in the air curing the coating.

Air may be added to the cabinet 10 by suitable air compression mechanism and fumes withdrawn by suitable vacuum devices. In the present modification vents 38, closed by suitable closures 40, are located in the opposite ends, instead of the use of vacuum devices.

In loading the cabinet a lid 32 may be raised into dot-dash position, at which time the attendant may remove the coated articles that have been cured and substitute newly coated articles therefor. Due to the slow rotation of the support 12, this may be done while the machine rotates. The amount of fumes lost to the air seems to have no deleterious effect in so doing, as the freshly coated articles generate additional fumes very rapidly.

As already referred to, the fresh coating has a great affinity for moisture. It seems that by the present process condensation in the air in the upper portion of the cabinet 10 seems to have no deleterious effect upon the coating. It is believed that the fumes of the solvent have sufficient affinity for the moisture in the air, so as to dehydrate the air in the cabinet. This, however, is not definitely known at the present time. Suffice to state that no deleterious effect by moisture accumulating upon the articles has been discovered while curing the coating in the present apparatus.

The vat containing the solution 28 may be provided with a suitable drain accessible from the exterior of the cabinet, so as to withdraw the solution which has to be periodically replaced by new solution, as there is a tendency for the solution to become saturated with the solvent if it is not replenished periodically. Such a drain has been shown schematically at 34. Likewise, an intake opening 36 for adding additional solution has been shown.

If it is desirable to ornament the finish, this may be done by embossing the finish when it is partially dried or cured. For example, to provide a checkered finish a piece of cheese cloth or any other suitable woven fabric may be pressed against the partially set coating so as to produce the desired checkered effect. Any other suitable design may be embossed by placing the article having the partially set coating in suitable embossing dies, which will leave the surface with a configuration complementing the embossing die. The embossing operation can best be performed upon articles having a comparatively thick coating of nitrocellulose material, unless it is desirable to produce a comparatively shallow ornamentation.

Instead of letting the entire coat partially cure, it is possible to first apply one coating, let it set and then apply a second thin coating, which softens the outer surface of the first coating, and emboss the article in this stage.

Defective coatings may be refinished by dipping the coated article into a second solution that is very thin, having a large percentage of solvent, which solvent will dissolve the outer surface of the the first coating, causing it to smooth and eliminate pin holes and other defects therein.

Instead of dipping the coated article into a solution having a great attraction for the solvent used in dissolving the nitrocellulose material, the freshly coated articles may be sprayed by a spray formed from a solution forming fumes having an attraction for the solvent. A gasoline spray, for example, has been found to give excellent results. Any other suitable spray may be used.

This has been found to give excellent results and seems to rapidly cure the coating. The spray is applied over a short period of time, after which the article is permitted to remain in a gaseous medium having an extremely high vapor pressure, so that the withdrawal of the solvent is checked while the article is exposed to oxygen, which dries the nitrocellulose material, causing it to shrink, thereby increasing the pressure upon the solvent remaining in the coating. A second spraying may then take place so as to withdraw further solvent and the succeeding steps following the first spraying being then repeated, so as to further cure the coating of the article.

Figure 4:
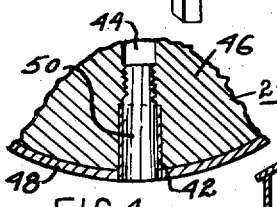
Fig. 4 is an enlarged fragmentary view of the article to be finished.
Figure 2:
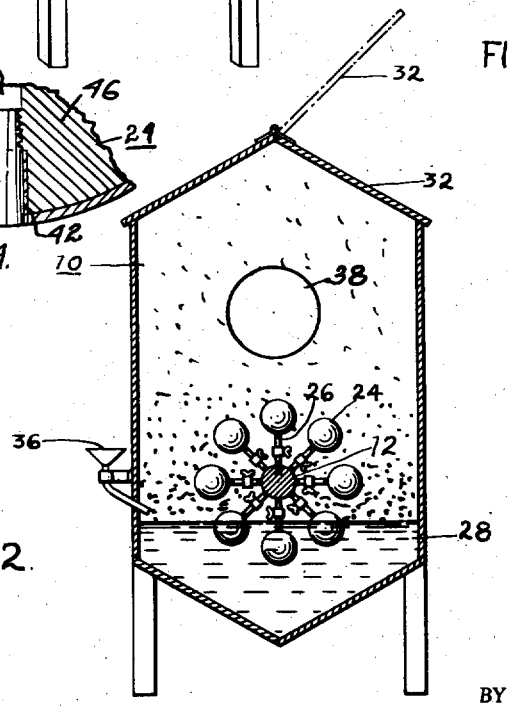
Fig. 2 is a vertical transverse sectional view.
Figure 3:
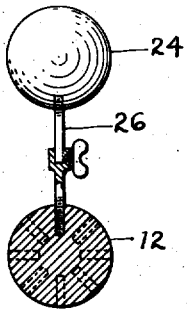
Fig. 3 is an enlarged fragmentary view of the holder for the article.

Referring to the disclosure shown in Fig. 4, a portion of a ball 24 has been shown in section to show the details of the finishing of the ball.

A small tubular sleeve 42 is inserted over the supporting stud 26. This sleeve is preferably a preformed sleeve, having a solvent common to the nitrocellulose material inserted into the hole 44 in the core 46. As the ball is coated with the nitrocellulose coating 48, a homogeneous union is formed. In the absence of such a sleeve surrounding the stud, the coating 48 is usually defective in the immediate vicinity of the stud 26 in that pockets or voids form in the coating adjacent the rod or stud 26. By the use of such a sleeve all voids are eliminated and the coating is perfect up to the sleeve.

For the purpose of contrast and ornamentation the sleeve 42 may be of a different color from that of the coating.

After removing the stud 26, the sleeve 42 remains in the aperture 44 in the core 46. A threaded plug 50, having a solvent common to the sleeve, preferably a contrasting color, is then inserted in the aperture vacated by the stud 26.

After the ball 24 has been coated and the plug 50 inserted the end of the plug 50 and the end of the sleeve 42 together with the adjacent coating 48 are then burnished to present a uniform surface.

Instead of having the sleeve 42 and the plug 50 exposed at their outer ends, these may terminate within the outer surface of the coating 48 to permit the application of coating material outside of the ends of members 42 and 50 so as to produce a finished ball of a uniform color throughout.

The plug 50 as shown is threaded. The threads may be omitted and the outer surface softened by the solvent for the nitrocellulose material which results in a homogeneous union between the plug 50 and the sleeve 42. Even though the plug 50 is threaded such a homogeneous union may be used.

Although the preferred modification of the device has been described, it will be understood that within the purview of this invention various changes may be made in the form, details, proportion and arrangement of parts, which generally stated consist in a device capable of carrying out the objects set forth, in the novel parts, combination of parts and mode of operation, as disclosed and defined in the appended claims.

Having thus described my invention, I claim:

1. The method of curing a nitrocellulose coating applied by dipping an article in a nitrocellulose solution including the steps of rotating the article through a circular path divided into three zones, the bottom zone containing a solution having an attraction for the solvent used in dissolving the nitrocellulose material, said nitrocellulose material being practically insoluble in said solution, the zone above the solution having a medium saturated with the fumes of the solvent and an air zone above the fume zone, the article being moved by cyclic rotation through the solution having an attraction for the solvent; into the fume zone; and then into the air zone so as to periodically subject the coating on the article to the effects of the fluids of the several zones.

2. The method of coating articles with nitrocellulose material dissolved in a solvent including sixty percent acetone, twenty-five percent isopropyl acetate and fifteen percent anhydrous isopropanol, including the steps of applying the nitrocellulose material to the article to be coated and treating the coating in cycles, each cycle including the rapid withdrawal of the solvent for a short period of time by dipping the coated article into gasoline, followed by the surrounding of the article by air having fumes of the solvent, so as to cause the nitrocellulose material to shrink.

3. The method of coating articles with nitrocellulose material dissolved in a solvent, including the steps of applying the nitrocellulose material to the article to be coated and treating the coating in a series of cycles, each cycle including the rapid withdrawal of the solvent for a short period of time by subjecting the coating to the influence of a medium having attraction for the solvent used in dissolving the nitrocellulose material, in which medium the nitrocellulose material is substantially insoluble, followed by the surrounding of the article by a vapor having high vapor pressure by having fumes of the solvent therein so as to cause the nitrocellulose material to shrink.

4. The method of coating articles with nitrocellulose material dissolved in a solvent, including the steps of applying the coating to the article, subjecting the article to a fluid medium which rapidly withdraws a portion of the solvent, said medium having attraction for the solvent used in dissolving the nitrocellulose material, in which medium the nitrocellulose material is substantially insoluble, followed by subjecting the article to a second medium practically saturated with the solvent to stop the withdrawal of the solvent, which causes a shrinking of the coating so as to increase the pressure upon the solvent within the article and again rapidly withdrawing another portion of the solvent by again subjecting the coating to the influence of said fluid medium.

5. The method of coating an article with nitrocellulose material dissolved in a solvent, including the steps of applying the nitrocellulose material to the article, subjecting the outer surface of the nitrocellulose material to the influence of a solution having a great attraction for the solvent, the nitrocellulose material being practically insoluble in said solution, subjecting the article to a medium substantially saturated with the solvent, and subjecting the article to air so as to cause the nitrocellulose material to shrink to thereby increase the pressure upon the solvent within the article.

6. The method of coating an article with cellulose material dissolved in a solvent, including the steps of applying the cellulose material to the article, dipping the article in a solution having a great attraction for the solvent, the cellulose material being practically insoluble in said solution, changing the solution in contact with the article by a relative movement of one with respect to the other, subjecting the surface of the article to a medium having a high vapor pressure so as to cause shrinkage of the coating on the article so as to increase the pressure upon the remaining solvent in the coating.

7. The method of coating an article with nitrocellulose material dissolved in a solvent, including the steps of applying the nitrocellulose material to the article, spraying a solution having a great attraction for the solvent upon the coating of the article, the nitrocellulose material being practically insoluble in said solution, subjecting the surface of the article to a comparatively high vapor pressure of the solvent so as to deter the evaporation of the solvent in the coating so as to cause the coating to shrink to increase the pressure upon the remaining solvent.

8. A process of coating an article with nitrocellulose including the steps of dissolving the nitrocellulose in a solvent, dipping the article to be coated in the nitrocellulose solution, periodically moving the article into a solution having an attraction for the solvent in which the nitrocellulose is practically insoluble, transferring the article from the solution to a zone containing fumes of the solvent, transferring the article to a third zone where the article is subjected to air, returning the article to the fume zone to complete the cycle, repeating the cycle until the solvent has been sufficiently removed to permit the coating of the article to dry in atmosphere.

9. The method of coating an article including the steps of dipping the article in a solution formed by dissolving nitrocellulose in a solvent, moving the article into a solution having an attraction for the solvent used in dissolving the nitrocellulose, said nitrocellulose being practically insoluble in said solution, and moving the article into a zone containing fumes of the solvent.

10. The method of coating an article with nitrocellulose including the steps of applying nitrocellulose dissolved in a solution by a solvent, placing the coated article in a solution having an attraction for the solvent, said nitrocellulose being practically insoluble in said solution, and removing the coated article into a gaseous medium including fumes from the solvent so as to allow the solvent remaining in the coating to be substantially uniformly distributed therein.

11. The method of coating an article with nitrocellulose including the steps of applying a nitrocellulose coating to the article from nitrocellulose that has been dissolved in a suitable solvent, subjecting the coating to a fluid solvent mixture medium having attraction for said solvent, said medium substantially failing to penetrate the nitrocellulose coating, to remove a portion of the solvent from the outer surface of the coating so as to cause the osmotic pressure gradient to vary throughout the thickness of the coating, and subsequently uniformly redistributing the solvent within the coating, and repeating the cycle of operation periodically until the article may be dried in air.

12. The process of applying a nitrocellulose coating to an article including the steps of dipping the article in a nitrocellulose solution having a solvent for the nitrocellulose, periodically subjecting the coating to a fluid solvent mixture medium having attraction for said solvent, said medium substantially failing to penetrate the nitrocellulose coating to remove the solvent from the outer surface of the coating, subsequently redistributing the remaining solvent uniformly throughout the coating, subjecting the coated article to the influence of atmosphere and repeating the cycle periodically until the coating has set sufficiently to dry under normal atmospheric conditions.

13. The method of curing a collodion coating including the steps of contacting the article with a fluid solvent mixture medium having attraction for the solvent of the collodion coating, in which medium the collodion coating is substantially insoluble, to rapidly withdraw the solvent for a short period of time and subsequently subjecting the coated article to a medium having sufficient fumes of the solvent therein to deter the evaporation of the solvent.

14. The method of curing a collodion coating including the steps of contacting the article with a fluid solvent mixture medium having attraction for the solvent of the collodion coating, in which medium the collodion coating is substantially insoluble, to rapidly withdraw the solvent for a short period of time, subsequently subjecting the coated article to a medium having sufficient fumes of the solvent therein to deter the evaporation of the solvent, so as to reduce the volume of the coating thereby increasing the density of the solvent.

15. The method of cyclically curing a collodion coating, each cycle including the steps of contacting the article with a fluid solvent mixture medium having attraction for the solvent of the collodion coating, in which medium the collodion coating is substantially insoluble, to rapidly withdraw the solvent for a short period of time, and subsequently subjecting the coated article to a medium having sufficient fumes of the solvent therein to deter the evaporation of the solvent, the cycles being repeated until the coating has cured sufficiently to permit further curing thereof under normal atmospheric conditions.

16. The method of cyclically curing a collodion coating, each cycle including the steps of contacting the article with a fluid solvent mixture medium having attraction for the solvent of the collodion coating, in which medium the collodion coating is substantially insoluble, to rapidly withdraw the solvent for a short period of time, subsequently subjecting the coated article to a medium having sufficient fumes therein to deter the evaporation of the solvent, so as to reduce the volume of the coating thereby increasing the density of the solvent, the cycles being repeated until the coating has cured sufficiently to permit further curing thereof under normal atmospheric conditions.

17. The method of coating an article with a coating material dissolved in a solvent which is highly volatile at ordinary atmospheric temperatures, including the steps of applying the coating material to the article, subjecting the outer surface of the coating material to the influence of a solution having a great attraction for the solvent, the coating material being practically insoluble in said solution, the solvent flowing from the coating material into the solution while in a liquid state at ordinary atmospheric temperatures, and subjecting the coated article to a medium substantially saturated with the solvent to arrest the rapid escape of the solvent from the coating material, said saturated medium having practically no effect upon the coating material per se.

18. The method of coating articles with a coating material dissolved in a solvent which is highly volatile at ordinary atmospheric temperatures, including the steps of applying the coating material to the article to be coated and treating the coating in a series of cycles, each cycle including the rapid withdrawal of the solvent for a short period of time by subjecting the coating to the influence of a medium having an attraction for the solvent used in dissolving the coating material, in which medium the coating material is substantially insoluble, followed by the surrounding of the article with a vapor saturated with the fumes of the solvent used in dissolving the coating material so as to arrest the rapid escape of the solvent from the coating material during this portion of the cycle.

19. The method of cyclically curing a coating material applied by dipping an article into a coating material dissolved by a solvent which is highly volatile at ordinary atmospheric temperatures, each cycle including the steps of dipping the coated article into a solution having an attraction for the solvent of the coating, in which solution the coating is substantially insoluble, to rapidly withdraw the solvent for a short period of time, and subsequently subjecting the coated article to a medium having sufficient fumes therein to deter the evaporation of the solvent, the cycles being repeated until the coating is cured sufficiently to permit further curing thereof under normal atmospheric conditions.

ELVIN M. BRIGHT.